(12) United States Patent
Belivan et al.

(10) Patent No.: US 12,474,194 B2
(45) Date of Patent: Nov. 18, 2025

(54) MEASURING A VOLUME OF GAS IN LIQUID FORM STORED IN A TANK USING MAGNETIC SENSORS

(71) Applicant: 7-Eleven, Inc., Irving, TX (US)

(72) Inventors: Ramin Belivan, Plano, TX (US); Matthew O'Daniel Redmond, Denton, TX (US)

(73) Assignee: 7-ELEVEN, INC., Irving, TX (US)

( * ) Notice: Subject to any disclaimer, the term of this patent is extended or adjusted under 35 U.S.C. 154(b) by 309 days.

(21) Appl. No.: 18/154,701

(22) Filed: Jan. 13, 2023

(65) Prior Publication Data

US 2024/0240980 A1 Jul. 18, 2024

(51) Int. Cl.
*G01F 23/38* (2006.01)

(52) U.S. Cl.
CPC .................... *G01F 23/38* (2013.01)

(58) Field of Classification Search
CPC .......... G01F 23/38; G01F 23/62; G01F 23/72
USPC .................... 73/314, 317, 319, 322
See application file for complete search history.

(56) References Cited

U.S. PATENT DOCUMENTS

| | | | | |
|---|---|---|---|---|
| 2,634,608 A | * | 4/1953 | Sorber | G01F 23/58 74/99 R |
| 2,697,350 A | * | 12/1954 | Gordon | G01F 23/34 73/317 |
| 2,784,273 A | * | 3/1957 | Binford | H01H 36/02 335/188 |
| 2,820,865 A | * | 1/1958 | Mckinnies | G01F 23/56 200/84 R |
| 3,218,857 A | * | 11/1965 | Woert | H01M 50/609 73/306 |
| 3,359,799 A | * | 12/1967 | Lubin | G01F 23/58 73/322 |
| 3,397,577 A | * | 8/1968 | Siebert | F17C 13/021 73/309 |
| 4,852,404 A | * | 8/1989 | Catanese | G01F 23/60 73/314 |
| 5,079,950 A | * | 1/1992 | McKiernan | G01F 23/00 73/311 |
| 5,479,820 A | * | 1/1996 | Fekete | G01F 23/62 116/303 |

* cited by examiner

*Primary Examiner* — John Fitzgerald
(74) *Attorney, Agent, or Firm* — Baker Botts L.L.P.

(57) ABSTRACT

A system comprises a rod placed inside a tank and configured to move a pre-configured distance as the level of a gas stored in the tank changes. A chamber is positioned in relation to a top region of the tank. A magnet is coupled to an upper portion of the rod and disposed inside the chamber such that the magnet moves with the rod. A circuit board is positioned adjacent to the chamber and includes two sensors positioned along the length of the chamber, wherein each sensor generates a voltage signal corresponding to a strength of magnetic field associated with the magnet. A memory stores voltage values corresponding to the voltage signal and a processor coupled to the memory calculates a volume of the gas in liquid form in the tank based on a voltage value generated by at least one of the sensors.

11 Claims, 3 Drawing Sheets

MEASURING A VOLUME OF GAS IN LIQUID FORM STORED IN A TANK USING MAGNETIC SENSORS

TECHNICAL FIELD

The present disclosure relates generally to data processing, and more specifically to measuring a volume of a gas in liquid form stored in a tank using magnetic sensors.

BACKGROUND

Present systems for measuring a volume of a gas (e.g. CO2) stored in a tank typically include indicating a measurement of the gas volume on a visual analog gauge generally attached to the tank. In these type of systems, the only way to know a current volume of the gas in liquid form stored in the tank is to visually inspect the gauge and read the measurement shown by the gauge. Thus, the present methods for measuring and recording a volume of a gas stored in the tank are prone to human errors. For example, incorrect reading of the visual gauge or infrequent reading and recording of gas levels in the tank may lead to the gas running out unexpectedly which may cause interruption in service and loss of revenue and reputation.

SUMMARY

The system and methods implemented by the system as disclosed in the present disclosure provide technical solutions to the technical problems discussed above by providing techniques to generate precise digital measurements of a volume of a gas stored in a tank. Embodiments of the present disclosure provide an apparatus for performing digital measurements of the volume of gas in liquid form stored in a tank. The apparatus includes a rod placed inside the tank and extending at least a portion of a length of the tank, wherein an upper portion of the rod extends out of the top region of the tank, wherein the rod moves up and down over a pre-configured distance as the level of the gas stored in the tank increases and decreases respectively. A longitudinal chamber is positioned in relation to the top region of the tank and a magnet is coupled to the upper portion of the rod and disposed inside the longitudinal chamber such that a movement of the rod causes a proportional movement of the magnet along the length of the chamber. A position of the magnet within the chamber is indicative of a volume of the gas in liquid form in the tank such that the magnet positioned at a bottom end of the chamber indicates an empty tank and the magnet positioned at a top end of the chamber indicates a full tank.

A circuit board is positioned adjacent to the longitudinal chamber. The circuit board includes a first sensor positioned at an upper half of the chamber and a second sensor positioned at a lower half of the chamber. Each of the first and second sensors is configured to generate a voltage signal corresponding to a strength of magnetic field associated with the magnet, wherein the voltage signal is based at least in part upon a position of the magnet in the chamber in relation to the sensor. The circuit board further includes a memory that stores a first voltage value generated by the first sensor and a second voltage value generated by the second sensor. The circuit board includes a processor that is communicatively coupled to the memory and configured to access at least one of the first voltage value and the second voltage value and calculate a volume of the gas in liquid form stored in the tank based at least in part on the first and/or second voltage values. The processor is configured to transmit an alert message using a network interface in response to detecting that the calculated volume of the gas in liquid form in the tank has fallen below a pre-configured volume. The transmitted alert message may include a digital value (e.g., percentage value) of the volume of gas in liquid form calculated by the processor.

The digital volume measurement of the gas stored in the tank provides a precise measurement of a current volume of gas in liquid form stored in the tank which avoids human errors associated with reading a measurement from a visual gauge. Further, the alert message may be sent to a designated computing node (e.g., a computer of accessible to a store manager, store clerk, service personnel etc.) which may allow for timely refilling of the tank and avoid loss of service due to the tank running out of the gas.

Thus, the disclosed system and method improve the technology associated with measuring a volume of gas in liquid form stored in a tank.

Certain aspects of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
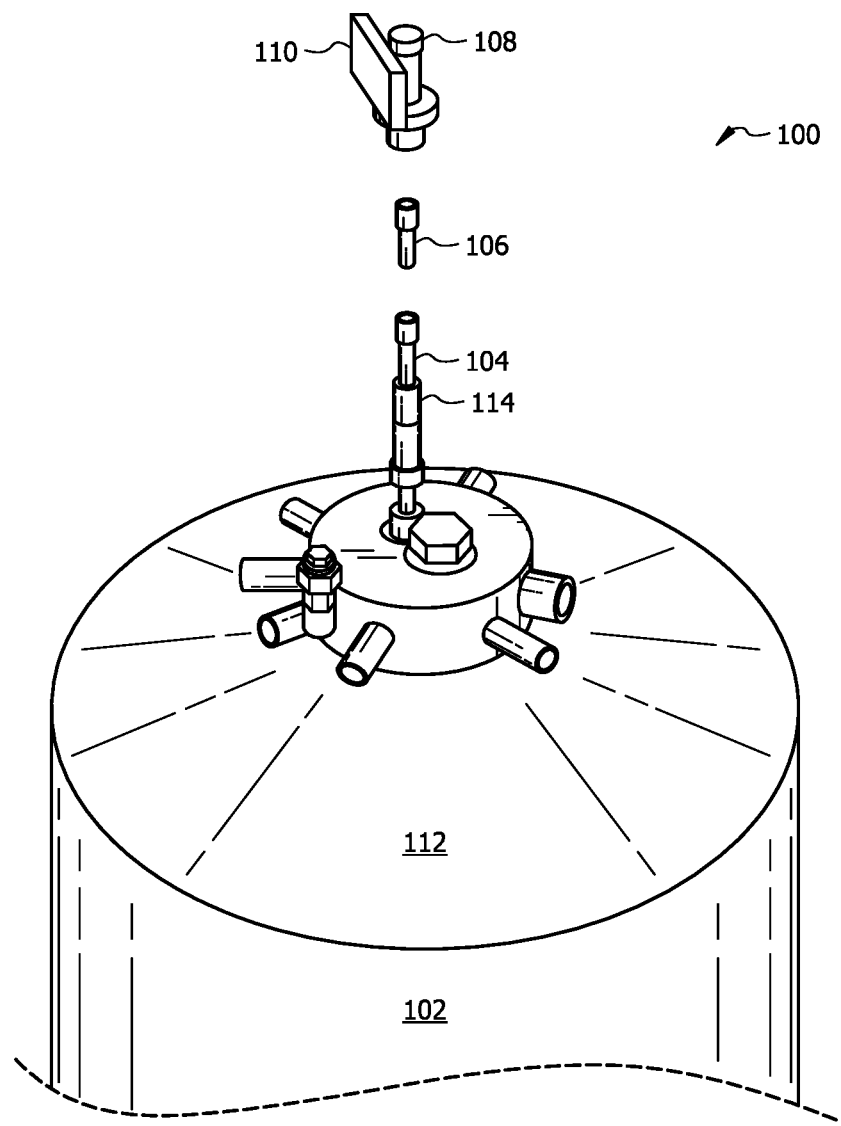
FIG. 1 illustrates an exploded view of an example tank setup used for storing a gas, in accordance with certain embodiments of the present disclosure.

FIG. 1 illustrates an exploded view of an example tank setup 100 used for storing a gas, in accordance with certain aspects of the present disclosure. It may be noted that only those parts of the tank that are relevant to the following disclosure are described herein.

As shown in FIG. 1, the tank setup 100 includes a tank 102 that stores a gas (e.g., carbon dioxide (CO2)) in liquid form. It may be noted that the tank setup 100 shows a top region 112 of the tank 102 only. The tank 102 includes an apparatus for measuring a volume of the gas in liquid form currently stored in the tank 102, wherein the apparatus includes a rod 104 vertically placed inside the tank 102 and extending at least a portion of a vertical length of the tank 102. As shown in FIG. 1, an upper portion of the rod 104 extends out of the top region 112 of the tank 102. The rod 104 is configured to move vertically in conjunction with a change in a level/volume of the gas in liquid form stored in the tank 102. For example, the rod 104 is configured to move up and down over a pre-configured distance as the level of the gas stored in the tank 102 increases and decreases, respectively. Gas is typically stored in the tank 102 in its liquid state at high pressure. All references in this disclosure to a volume of the gas stored in the tank relate to a volume of the gas in its liquid form as stored in the tank 102.

A magnet 106 is coupled (e.g., attached) to the upper portion of the rod 104 such that a movement of the rod 104 causes a corresponding movement of the magnet 106. The upper portion of the rod 104 along with the magnet 106 attached thereto are received inside a longitudinal chamber 108 positioned above the tank 102. For example, a bottom end of the chamber 108 is coupled to a top end of a pipe 114 that houses the upper portion of the rod 104 and within which the rod 104 is free to move such that the upper portion of the rod 104 along with the magnet 106 attached thereto moves along the length of the chamber 108. The rod 104 is weighted such that the total vertical travel of the rod 104 is limited to cause the magnet 106 to move the length of the chamber only. The length of the chamber 108 represents the total volume of the gas in liquid form stored in the tank 102 when the tank is full, wherein the magnet 106 when positioned at a bottom end of the chamber 108 indicates an empty tank and the magnet 106 when positioned at a top end of the chamber 108 indicates a full tank. An analog gauge 110 may be optionally coupled to the chamber 108 such that a position of the magnet 106 along the length of the chamber 108 causes an analog pointer of the gauge 110 to indicate a corresponding volume of gas in liquid form stored in the tank 102. The analog gauge 110 may be manually inspected by a user (e.g., a store clerk) to determine a current volume of the gas in liquid form stored in the tank 102.

Embodiments of the present disclosure disclose techniques for providing a digital measurement of a volume of gas in liquid form stored in the tank 102.

Figure 2:
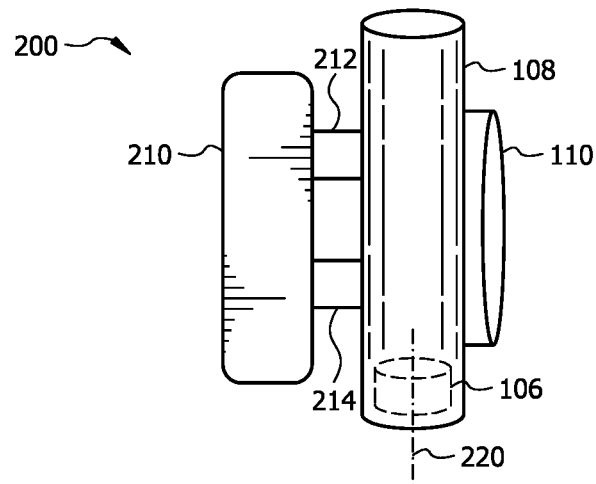
FIG. 2 is a schematic diagram of an example apparatus for digital measurement of a volume of gas in liquid form stored in the tank, in accordance with certain embodiments of the present disclosure.

FIG. 2 is a schematic diagram of an example apparatus 200 for digital measurement of a volume of gas in liquid form stored in the tank, in accordance with certain embodiments of the present disclosure.

As shown in FIG. 2, example apparatus 200 includes a circuit board 210 positioned adjacent to the chamber 108. In one embodiment, the circuit board 210 includes or is otherwise electrically coupled to sensors 212 and 214, wherein the circuit board 210 is oriented in relation to the chamber 108 such that sensors 212 and 214 are facing the chamber 108. However, other orientations of the circuit board 210 may be used as long as the positions of the sensors 212 and 214 in relation to the length of the chamber 108 as discussed below are maintained. The circuit board 210 may be coupled to the chamber 108 using several methods including, but not limited to, tied to the chamber 108, glued to the chamber 108, fastened to the chamber using screws, manufactured as part of the chamber 108 etc. As described above, the magnet 106 which is attached to the top portion of the rod 104 (as shown in FIG. 1) is configured to move along the length of the chamber 108 as the level of the gas stored in the tank 102 changes. The length of the chamber 108 represents the total volume of the gas in liquid form stored in the tank 102 when the tank is full, wherein the magnet 106 when positioned at a bottom end of the chamber 108 indicates an empty tank (or, at least, substantially empty tank) and the magnet 106 when positioned at a top end of the chamber 108 indicates a full tank (or, at least, a substantially full tank). Thus, a position of the magnet 106 along the length of the chamber 108 is indicative of a volume of the gas in liquid form stored in the tank 102.

Figure 4:
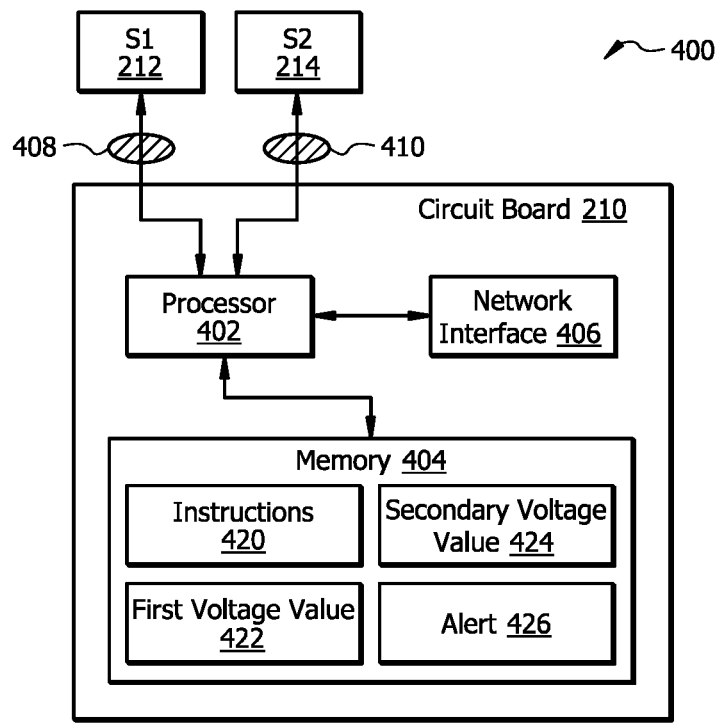
FIG. 4 is a schematic diagram of an example system of the circuit board shown in FIG. 2, in accordance with certain embodiments of the present disclosure.

Each of the sensors 212 and 214 generates a voltage signal (voltage signals 408 and 410 as shown in FIG. 4) corresponding to a strength of magnetic field associated with the magnet 106 as detected by the sensor 212 or 214. The magnetic field associated with the magnet 106 detected at a sensor 212/214 changes as the magnet 106 moves closer to or away from the sensor 212/214. Thus, in certain embodiments, the voltage signal generated by a sensor 212/214 corresponds to a position of the magnet 106 in relation to the sensor 212/214. In one example, each of the sensors 212 and 214 is a Hall effect sensor. While certain embodiments of the present disclosure describe aspects of the invention in relation to Hall effect sensors, a person having ordinary skill in the art can appreciate that other types of sensors may also be used that are capable of generating voltage signals corresponding to a detected strength of a magnetic field. The magnet 106 may correspond to one of several combinations of shapes and sizes. In one embodiment, as shown in FIG. 2, the magnet 106 is a disk magnet arranged in the chamber 108 such that a central axis 220 of the magnet 106 is parallel to a plane of installation of the sensors 212 and 214. As shown, the central axis 220 is parallel to a front face of each of the sensors 212/212 that faces an outer wall of the chamber 108.

It may be noted that the analog gauge 110 shown in FIG. 2 is optional in the example apparatus 200.

Figure 3:
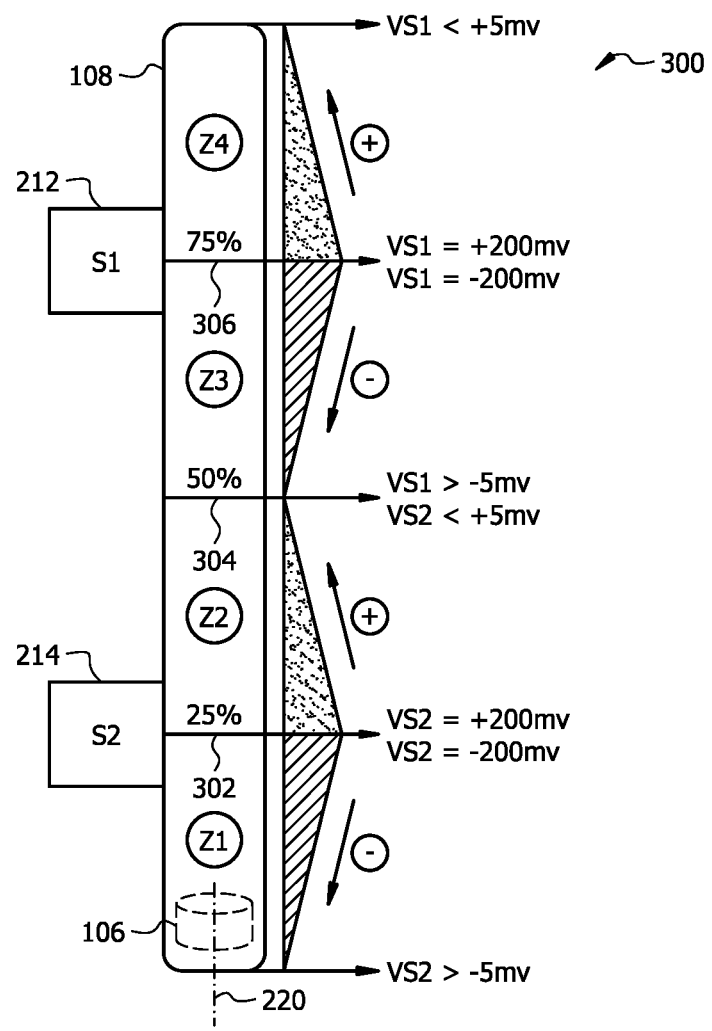
FIG. 3 is a schematic diagram of an example voltage response of sensors shown in FIG. 2, in accordance with certain embodiments of the present disclosure.

FIG. 3 is a schematic diagram of an example voltage response 300 of sensors 212 and 214 shown in FIG. 2, in accordance with certain embodiments of the present disclosure.

As shown in FIG. 3, the magnet 106 is a disk magnet arranged in the chamber 108 such that the central axis 220 of the magnet 106 is parallel to a plane of installation of the sensors 212 and 214. In this case, each of the sensors 212 and 214 generates a maximum absolute voltage value when the magnet 106 is positioned closest to the sensor (e.g., right in front of the sensor). The absolute voltage value generated by each of the sensors 212 and 214 decreases as the magnet 106 moves away from the sensor. In this case, each sensor 212 and 214 generates a positive voltage value when the magnet 106 is positioned above the sensor 212/214 and generates a negative voltage value when the magnet 106 is positioned on below the sensor 212/214. Additionally, each sensor 212/214 generates a lower absolute value as the magnet 106 moves away from the sensor 212/214.

Example voltage response 300 shows a voltage response associated with sensor 212 (also shown as S1) and sensor 214 (also shown as S2) based on different positions of the magnet 106 in relation to the respective sensors 212/214. Example voltage response 300 assumes that the voltage response range of sensors 212 and 214 is −200 mv to +200 mv. However, it may be noted that while embodiments of the disclosure describe techniques for measuring a volume of gas in liquid form stored in a tank 102 with the assumption that the sensors 212 and 214 have a voltage response range of −200 mv to +200 mv, a person having ordinary skill in the art can appreciate that the same techniques may work with sensors having other voltage response ranges.

As shown in FIG. 3, the positions of sensors S1 and S2 along the length of the chamber are chosen such that the length of the chamber 108 is divided into four logical zones based on the voltage responses of sensors S1 and S2. These four zones are shown as Z1, Z2, Z3 and Z4 with logical zone boundaries at the 25% mark 302, 50% mark 304 and 75% mark 306. As shown, sensor S1 is positioned at (or near) the 25% mark 302 and sensor S2 is positioned at (or near) the 75% mark 306. The magnet 106 positioned at the 25% mark 302 represents 25% of a full tank (e.g., 100%), the magnet 106 positioned at the 50% mark 304 represents 50% of the full tank, and the magnet 106 positioned at the 75% mark 306 represents 75% of the full tank. Thus, when the magnet 106 is positioned in Z1, the volume (V) of gas in the tank 102 is $0 \leq V \leq 25\%$. When the magnet 106 is positioned in Z2, the volume (V) of gas in the tank 102 is $25\% \leq V \leq 50\%$. When the magnet 106 is positioned in Z3, the volume (V) of gas in the tank 102 is $50\% \leq V \leq 75\%$. When the magnet 106 is positioned in Z4, the volume (V) of gas in the tank 102 is $75\% \leq V \leq 100\%$.

As described in more detail below, depending on the position of the magnet 106 along the length of the chamber 108, the voltage response of at least one of the sensors S1 and S2 corresponds to the actual position of the magnet 106 in the chamber 108. Thus, the voltage response of at least one of the sensors S1 and S2 may be used to determine the volume of gas in liquid form stored in the tank 102.

As shown in FIG. 3, a position of the magnet 106 in front of sensor S1 (e.g., at or near the 75% mark 306) causes sensor S1 to generate the maximum (or near maximum) absolute voltage value of 200 mv which indicates that the tank is 75% full or near 75% full. As the magnet 106 moves above the 75% mark 306 further up into Z4, sensor S1 generates a positive voltage value. The further away magnet 106 moves from S1 in zone Z4, the lower is the absolute voltage value generated by S1 until the magnet is positioned at or near the top of Z4 at which time S1<+5 mv which indicates that the tank 102 is 100% or near 100% full. As the magnet 106 moves below the 75% mark 306 further down into Z3, sensor S1 generates a negative voltage value. The further away magnet 106 moves from S1 in zone Z3, the lower is the absolute voltage value generated by S1 until the magnet is positioned at or near the boundary of Z3 and Z2 at the 50% mark 304 at which time S1>−5 mv, which indicates that the tank 102 is 50% or near 50% full.

Similarly, a position of the magnet 106 in front of sensor S2 (e.g., at or near the 25% mark 302) causes sensor S2 to generate the maximum (or near maximum) absolute voltage value of 200 mv, which indicates that the tank is 25% full or near 25% full. As the magnet 106 moves above the 25% mark 302 further up into Z2, sensor S2 generates a positive voltage value. The further away magnet 106 moves from S2 in zone Z2, the lower is the absolute voltage value generated by S2 until the magnet is positioned at or near the boundary of Z2 and Z3 near the 50% mark 304 at which time S2<+5 mv, which indicates that the tank 102 is 50% or near 50% full. As the magnet 106 moves below the 25% mark 302 further down into Z1, sensor S2 generates a negative voltage value. The further away magnet 106 moves from S2 in zone Z1, the lower is the absolute voltage value generated by S2 until the magnet is positioned at the bottom of Z1 at which time S2>−5 mv, which indicates that the tank 102 is empty or near empty (e.g. 0%).

It may be noted that when the magnet 106 is at or near the 50% mark 304, the voltage values of S1 and/or S2 may be used to determine that the volume of gas in liquid form in the tank is 50%.

FIG. 4 is a schematic diagram of an example system 400 of the circuit board 210 and sensors 212/214 shown in FIG. 2, in accordance with certain embodiments of the present disclosure.

As shown in FIG. 4, circuit board 210 is electrically coupled to a first sensor 212 (S1), a second sensor 214 (S2). For example, each of the first sensor 212 and second sensor 214 may be connected to the circuit board 210 using electrical wires. In an alternative embodiment, sensors 212 and 214 may be part of the circuit board 210 (e.g., soldered to the circuit board 210). The circuit board 210 may include a processor 402, a memory 404 and a network interface 406. The processor 402 is communicatively coupled to the first sensor 212, second sensor 214, memory 404 and network interface 406. In certain embodiments, the processor 402 is configured to run instructions 420 (e.g., software code) that intelligently determines a volume of gas in liquid form stored in a tank 102 based on voltage values corresponding to voltage signals 408/410 generated by at least one of the first sensor 212 and the second sensor 214.

The first sensor 212 generates a first voltage signal 408 corresponding to a strength of magnetic field associated with the magnet 106. Similarly, the second sensor 214 generates a second voltage signal 410 corresponding to the strength of magnetic field associated with the magnet 106. The memory 404 is configured to store voltage values 422/424 corresponding to the voltage signals 408 and 410 generated by the first sensor 212 and the second sensor 214. For example, the memory 404 is configured to store a first voltage value 422 associated with the first voltage signal 408 and a second voltage value 424 associated with the second voltage signal 410. Additionally, or alternatively, the memory 404 may be configured to store instructions 420 (e.g., software program/code) that are run by the processor 402 to implement operations described in embodiments of the present disclosure including operations for determining a volume of gas in liquid form stored in the tank 102.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions 420 to implement certain operations described in this disclosure. In this way, processor 402 may be a special-purpose computer designed to implement the functions disclosed herein. In one or more embodiments, functions of the processor 402 are implemented using logic units, FPGAs, ASICs, DSPs, or any other suitable hardware. The processor 402 is configured to operate as described with reference to FIGS. 1-5. For example, processor 402 may be configured to perform at least a portion of the methods 500 as described in FIG. 5.

The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise a read-only memory (ROM), random-access memory (RAM), ternary content-addressable memory (TCAM), dynamic random-access memory (DRAM), and static random-access memory (SRAM).

The memory 404 is operable to store, among other things, the first voltage value 422, second voltage value 424, and instructions 420 for implementing the functionality described herein. The instructions 420 stored in the memory 404 may include any suitable set of instructions, logic, rules, or code operable to implement the functionality disclosed herein.

The network interface 406 is configured to enable wired and/or wireless communications. The network interface 406 is configured to communicate data between the circuit board 210 and other devices, systems, or domains (e.g. a master controller, cloud infrastructure etc.). For example, the network interface 406 may comprise a Wi-Fi interface, a LAN interface, a WAN interface, a Bluetooth interface, a ZigBee interface, a modem, a switch, a router or based on any other communication protocol. The processor 402 is configured to send and receive data using the network interface 406. The network interface 406 may be configured to use any suitable type of communication protocol as would be appreciated by one of ordinary skill in the art.

In one embodiment, the components of the circuit board 210 shown in FIG. 4 may be implemented as two separate circuit boards. A first circuit board of the two circuit boards may be electrically coupled to the sensors 212/214 and may include the network interface 406. This first circuit board may be attached to the chamber 108. A second circuit board may include the processor 402 (e.g., a microcontroller) and the memory 406. This second circuit board may be communicatively coupled to the first circuit board. For example, the second circuit board may be connected to the first circuit board using data cables and may be positioned anywhere on the tank, in the vicinity of the tank or any other convenient location away from the tank 102.

Figure 5:
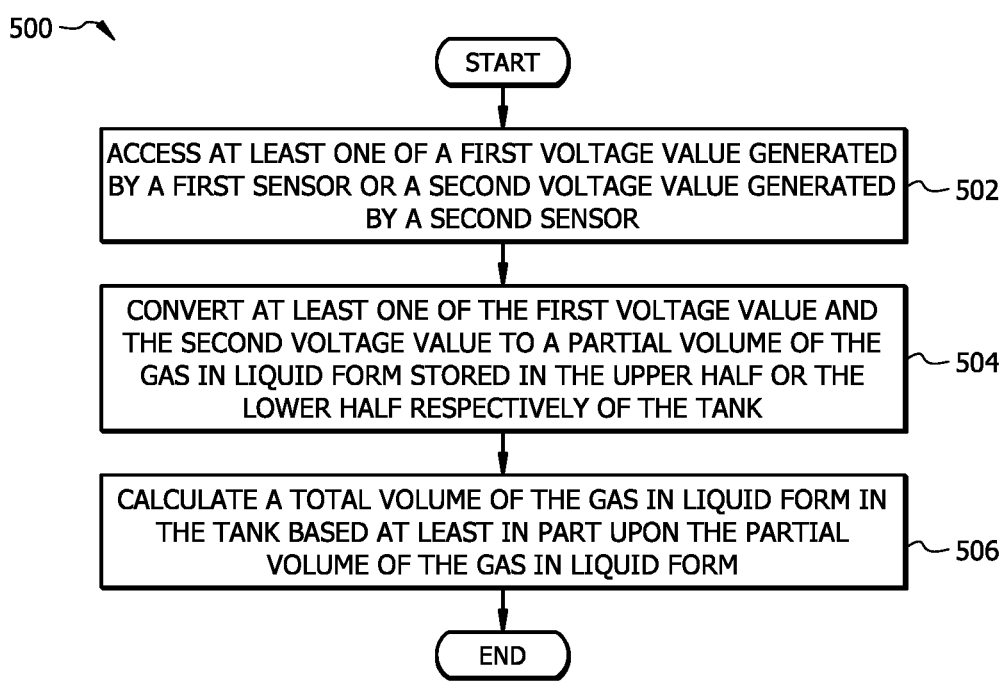
FIG. 5 is a flowchart of an example method for determining a volume of gas in liquid form stored in a tank, in accordance with certain embodiments of the present disclosure.

FIG. 5 is a flowchart of an example method 500 for determining a volume of gas in liquid form stored in a tank 102, in accordance with certain embodiments of the present disclosure. Method 500 may be performed by the processor 402 as shown in FIG. 4 and described above.

At operation 502, processor 402 accesses at least one of the first voltage value 422 generated by the first sensor 212 and the second voltage value 424 generated by the second sensor 214.

At operation 504, processor 402 converts at least one of the first voltage value 422 and the second voltage value 424 to a partial volume of the gas in liquid form in the upper half of the tank 102 (e.g., between 50% and 100% of full tank) or the lower half of the tank 102 (e.g., between 0% and 50% of full tank). For example, the processor 402 converts the first voltage value 422 to a partial volume of the gas in liquid form in the upper half of the tank 102 and/or converts the second voltage value 424 to a partial volume of the gas in liquid form in the lower half of the tank 102.

For example, referring back to FIG. 3, when the first voltage value 422 generated by sensor S1 (VS1) is a positive voltage value indicating that the magnet 106 is in zone Z4, processor 402 converts the first voltage value 422 to a partial volume of the gas in liquid form in the upper half of the tank 102 by calculating a delta percentage (D) of the volume of the gas in liquid form in the tank 102 based on equation (1) as:

$$D = (25 - (VS1 * 1/8))\qquad(1)$$

For example, when VS1<+5 mv, VS1 is set to 0 mv, and D is calculated as:

$$D = (25 - 0/8) = 25\%$$

In another example, when VS1=+200 mv, D is calculated as:

$$D = (25 - 200/8) = 0\%$$

It may be noted that (1/8) in equation (1) represents the inverse of a change in voltage value of the first sensor (S1) for every percentage increase in the volume of the gas in liquid form in the tank 102. For an example voltage range of S1 in Z4 is 0 to 200 mv. Thus, the change in voltage value of the first sensor (S1) for every percentage increase in the volume of the gas in liquid form is calculated as (200/25)=8.

When the first voltage value 422 generated by sensor S1 (VS1) is a negative voltage value indicating that the magnet 106 is in zone Z3, processor 402 converts the first voltage value 422 to a partial volume of the gas in liquid form in the upper half of the tank 102 by calculating a delta percentage (D) volume of the gas in liquid form in the tank 102 based on equation (2) as:

$$D = (abs(VS1) * 1/8)\qquad(2)$$

For example, when VS1=−200 mv, D is calculated as:

$$D = (200/8) = 25\%$$

In another example, when VS1>−5 mv, VS1 is set to 0 mv, and D is calculated as:

$$D = (0/8) = 0\%$$

It may be noted that (1/8) in equation (2) represents inverse of a change in voltage value of the first sensor (S1) for every percentage increase in the volume of the gas in liquid form in the tank 102. For an example voltage range of S1 in Z3 is 0 to −200 mv. Thus, the change in voltage value of the first sensor (S1) for every percentage increase in the volume of the gas in liquid form is calculated as (200/25)=8.

When the second voltage value 424 generated by sensor S2 (VS2) is a positive voltage value indicating that the magnet 106 is in zone Z2, processor 402 converts the second voltage value 424 to a partial volume of the gas in liquid form in the lower half of the tank 102 by calculating a delta percentage (D) volume of the gas in liquid form in the tank 102 based on equation (3) as:

$$D = (25 - (VS2 * 1/8))  \quad (3)$$

For example, when VS2<+5 mv, VS2 is set to 0 mv, and D is calculated as:

$$D = (25 - 0/8) = 25\%$$

In another example, when VS2=+200 mv, D is calculated as:

$$D = (25 - 200/8) = 0\%$$

It may be noted that (1/8) in equation (3) represents inverse of a change in voltage value of the second sensor (S2) for every percentage increase in the volume of the gas in liquid form in the tank 102. For an example voltage range of S2 in Z2 is 0 to +200 mv. Thus, the change in voltage value of the second sensor (S2) for every percentage increase in the volume of the gas in liquid form is calculated as (200/25)=8.

When the second voltage value 424 generated by sensor S2 (VS2) is a negative voltage value indicating that the magnet 106 is in zone Z1, processor 402 converts the second voltage value 424 to a partial volume of the gas in liquid form in the lower half of the tank 102 by calculating a delta percentage (D) volume of the gas in liquid form in the tank 102 based on equation (4) as:

$$D = (\text{abs}(VS2) * 1/8) \quad (4)$$

For example, when VS2=−200 mv, D is calculated as:

$$D = (200/8) = 25\%$$

In another example, when VS2>−5 mv, VS2 is set to 0 mv, and D is calculated as:

$$D = (0/8) = 0\%$$

It may be noted that (1/8) in equation (4) represents inverse of a change in voltage value of the second sensor (S2) for every percentage increase in the volume of the gas in liquid form in the tank 102. For an example voltage range of S2 in Z1 is 0 to −200 mv. Thus, the change in voltage value of the second sensor (S2) for every percentage increase in the volume of the gas in liquid form is calculated as (200/25)=8.

At operation 506, processor 402 calculates a total volume (V) of the gas in the tank 102 based at least in part upon the partial volume of the gas in liquid form determined in operation 504.

For example, processor 402 calculates the total volume (V) in accordance with the following algorithm:

If VS1 is a positive value (e.g., when magnet 106 is in Z4):

$$V = \%[75 + (D = (25 - VS1/8))]$$
$$V = [25 + 25 - 100/8] = 37.5\%$$

Else if S1 is in negative range (e.g., when magnet 106 is in Z3):

$$V = \%[50 + (D = (\text{abs}(VS1)/8))]$$

Else If S2 is a positive value (e.g., when magnet 106 is in Z2):

$$V = \%[25 + (D = (25 - VS2/8))]$$

Else if S2 is a negative value (e.g., when magnet 106 is in Z1):

$$V = \%[D = (\text{abs}(VS2)/8)]$$

For example, when VS1<+5 mv, VS1 is set to 0 mv, and V is calculated as:

$$V = [75 + (25 - 0/8)] = 75 + 25 = 100\%$$

In another example, when VS1=+200 mv, V is calculated as:

$$V = [75 + (25 - 200/8)] = 75 + 0 = 75\%$$

In another example, when VS1=+100 mv, V is calculated as:

$$V = [75 + (25 - 100/8)] = 87.5\%$$

For example, when VS1=−200 mv, V is calculated as:

$$V = [50 + (200/8)] = 50 + 25 = 75\%$$

In another example, when VS1>−5 mv, VS1 is set to 0 mv, and V is calculated as:

$$V = [50 + (0/8)] = 50 + 0 = 50\%$$

In another example, when VS1=−100 mv, V is calculated as:

$$V = [50 + (100/8)] = 62.5\%$$

For example, when VS2<+5 mv, VS2 is set to 0 mv, and V is calculated as:

$$V = [25 + (25 - 0/8)] = 25 + 25 = 50\%$$

In another example, when VS2=+200 mv, V is calculated as:

$$V = [25 + (25 - 200/8)] = 25 + 0 = 25\%$$

In another example, when VS2=+100 mv, V is calculated as:
For example, when VS2=−200 mv, V is calculated as:

$$V = (200/8) = 25\%$$

In another example, when VS2>−5 mv, VS2 is set to 0 mv, and V is calculated as:

$$V = (0/8) = 0\%$$

In another example, when VS2=100 mv, V is calculated as:

$$V - 100/8 = 12.5\%$$

It may be noted that an error factor (e.g., 10% or less) may be associated with the percentage volume (V) calculated based on the method discussed above. Accordingly, the total volume (V) may be determined to be any value from 0% to 100% at any suitable level of granularity depending on the voltage values determined by the sensors S1 and S2.

It may be noted that the processor 402 may be configured to determine the volume (V) of gas stored in the tank 102 periodically, at pre-scheduled times, in response to receiving a command (e.g., from a master controller), and/or in response to detecting certain events (e.g., change in a voltage value generated by at least one of the sensors S1 and S2.

In one or more embodiments, processor 402 may be configured to send out alerts in response to detecting that the volume of the gas in liquid form stored in the tank 102 has fallen below a pre-configured volume. For example, when the processor 402 determines the volume (V), the processor 402 stores the determined V % in the memory 404 as a previous volume reading. When the processor 402 generates subsequently calculates a new V %, processor 402 compares the new V % with the previously calculated V % stored in the memory 404. Based on the comparison, when the processor 402 detects that the volume (V) of the gas has equaled or fallen below a pre-selected threshold volume, the processor 402 transmits an alert message 426 (e.g., using the network interface 406) including an indication of the total volume (V) of the gas currently stored in the tank 102. In one embodiment, the alert message 426 may be sent to a designated computing node (e.g., a computer of accessible to a store manager, store clerk, service personnel etc.). The alert message 426 may allow for timely refilling of the tank 102 and avoid loss of service due to the tank 102 running out of the gas.

In one or more embodiments, processor 402 may be configured to determine a rate of decrease of the volume (V) of the gas in the tank 102. For example, processor 402 may calculate a plurality of values of the volume (V) of the gas in the tank after pre-configured time intervals (e.g., periodically). The processor 402 may store the plurality of values in memory 404. Processor 402 may calculate a rate of decrease of the volume of the gas in liquid form in the tank 102 based on the plurality of values of the volume of the gas in liquid form in the tank 102 determined over time. In response to detecting that the calculated rate of decrease of the volume (V) equals or is above a pre-selected threshold, the processor 402 may transmit (e.g., using the network interface 406) an alert message comprising the rate of decrease of the volume (V) of the gas in the tank 102. In one embodiment, the alert message may be sent to a designated computing node (e.g., a computer of accessible to a store manager, store clerk, service personnel etc.). An increase in the rate of decrease of the volume (V) of the gas may indicate above normal consumption of the gas, indicating a potential leak. Thus, the alert message may allow for timely detection and repair of leaks in the tank 102. Additionally, or alternatively, the alert message may allow for earlier than normal ordering of replacement gas to ensure timely refilling of the tank 102.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
a circuit board positioned adjacent to a longitudinal chamber, wherein:
the longitudinal chamber represents a total volume of a tank that stores a gas in liquid form;
a magnet is disposed inside the longitudinal chamber and configured to move along the length of the chamber, wherein a position of the magnet inside the longitudinal chamber represents a volume of the gas in liquid form stored in the tank;
the circuit board comprises:
a first sensor positioned at an upper half of the chamber and configured to generate a first voltage signal corresponding to a strength of magnetic field associated with the magnet, wherein the first voltage signal is based at least in part upon a position of the magnet in the upper half of the chamber in relation to the first sensor, wherein the upper half of the chamber represents an upper half of the total volume of the tank;
a second sensor positioned at a lower half of the chamber and configured to generate a second voltage signal corresponding to a strength of the magnetic field associated with the magnet, wherein the second voltage signal is based at least in part upon a position of the magnet in the lower half of the chamber in relation to the second sensor, wherein the lower half of the chamber represents a lower half of the total volume of the tank;
a memory configured to store a first voltage value associated with the first voltage signal and a second voltage value associated with the second voltage signal; and
a processor communicatively coupled to the memory and configured to:
access at least one of the first voltage value and the second voltage value;
convert at least one of the first voltage value and the second voltage value to a partial volume of the gas in liquid form in the upper half or lower half respectively of the tank; and
calculate a total volume of the gas in liquid form in the tank based at least in part upon the partial volume of the gas in liquid form.

2. The apparatus of claim 1, wherein:
the first sensor is positioned at a middle region of the upper half of the chamber;
the second sensor is positioned at a middle region of the lower half of the chamber;
the first voltage value generated by the first sensor is a positive value when the magnet is positioned above the first sensor;
the first voltage value generated by the first sensor is a negative value when the magnet is below the first sensor;
the second voltage value generated by the second sensor is a positive value when the magnet is positioned above the second sensor; and
the second voltage value generated by the second sensor is a negative value when the magnet is positioned below the second sensor.

3. The apparatus of claim 1, wherein the processor is configured to calculate the total volume of the gas in liquid form in the tank by:
determining that the first voltage value is a positive value indicating that the total volume of the gas in liquid form in the tank is at least at 75% of the full tank;
converting the first voltage value to the partial volume of the gas in liquid form by calculating a delta percentage volume of the gas in liquid form in the tank above 75% volume of the gas in liquid form by:
calculating an intermediate value by dividing the first voltage value by a change in voltage value of the first sensor for every percentage increase in volume of the gas in liquid form; and
subtracting the intermediate value from 25; and
calculating a total percentage volume of the gas in liquid form in the tank by adding the delta percentage volume to 75% volume of the gas in liquid form in the tank.

4. The apparatus of claim 1, wherein the processor is configured to calculate the total volume of the gas in liquid form in the tank by:
determining that the first voltage value is a negative value indicating that the total volume of the gas in liquid form in the tank is greater than or equal to 50% of the full tank and less than or equal to 75% of the full tank;
converting the first voltage value to the partial volume of the gas in liquid form by calculating a delta percentage volume of the gas in liquid form in the tank between 50% and 75% volume of the gas in liquid form by dividing an absolute value of the first voltage value by a change in voltage value of the first sensor for every percentage increase in volume of the gas in liquid form; and
calculating a total percentage volume of the gas in liquid form in the tank by adding the delta percentage volume to 50% volume of the gas in liquid form in the tank.

5. The apparatus of claim 1, wherein the processor is configured to calculate the total volume of the gas in liquid form in the tank by:
determining that the second voltage value is a positive value indicating that the total volume of the gas in liquid form in the tank is greater than or equal to 25% of the full tank and less than or equal to 50% of the full tank;
converting the second voltage value to the partial volume of the gas in liquid form by calculating a delta percentage volume of the gas in liquid form in the tank between 25% and 50% volume of the gas in liquid form by:
calculating an intermediate value by dividing the second voltage value by a change in voltage value of the second sensor for every percentage increase in volume of the gas in liquid form; and
subtracting the intermediate value from 25; and
calculating a total percentage volume of the gas in liquid form in the tank by adding the delta percentage volume to 25% volume of the gas in liquid form in the tank.

6. The apparatus of claim 1, wherein the processor is configured to calculate the total volume of the gas in liquid form in the tank by:
determining that the second voltage value is a negative value indicating that the total volume of the gas in liquid form in the tank is less than or equal to 25% of the full tank;
converting the second voltage value to the partial volume of the gas in liquid form by calculating a percentage volume of the gas in liquid form in the tank below the 25% volume of the gas in liquid form by dividing an absolute value of the second voltage value by a change in voltage value of the second sensor for every percentage increase in volume of the gas in liquid form; and determine the calculated percentage volume of the gas in liquid form as a total percentage volume of the gas in liquid form in the tank.

7. A method comprising:
obtaining at least a first voltage value associated with a first voltage signal generated by a first sensor and a second voltage value associated with a second voltage signal generated by a second sensor, wherein:
the first sensor is positioned at an upper half of a longitudinal chamber and the second sensor is positioned at a lower half of the longitudinal chamber;
the longitudinal chamber represents a total volume of a tank that stores a gas in liquid form;
a magnet is disposed inside the longitudinal chamber and configured to move along the length of the chamber, wherein a position of the magnet inside the longitudinal chamber represents a volume of the gas in liquid form stored in the tank;
the first sensor is configured to generate the first voltage signal corresponding to a strength of magnetic field associated with the magnet, wherein the first voltage signal is based at least in part upon a position of the magnet in the upper half of the chamber in relation to the first sensor, wherein the upper half of the chamber represents an upper half of the total volume of the tank; and
the second sensor is configured to generate the second voltage signal corresponding to a strength of the magnetic field associated with the magnet, wherein the second voltage signal is based at least in part upon a position of the magnet in the lower half of the chamber in relation to the second sensor, wherein the lower half of the chamber to represents a lower half of the total volume of the tank;
converting at least one of the first voltage value and the second voltage value to a partial volume of the gas in liquid form in the upper half or lower half respectively of the tank; and
calculating a total volume of the gas in liquid form in the tank based at least in part upon the partial volume of the gas in liquid form.

8. The method of claim 7, wherein calculating the total volume of the gas in liquid form in the tank comprises:
determining that the first voltage value is a positive value indicating that the total volume of the gas in liquid form in the tank is at least at 75% of the full tank;
converting the first voltage value to the partial volume of the gas in liquid form by calculating a delta percentage volume of the gas in liquid form in the tank above 75% volume of the gas in liquid form by:
calculating an intermediate value by dividing the first voltage value by a change in voltage value of the first sensor for every percentage increase in volume of the gas in liquid form; and
subtracting the intermediate value from 25; and calculating a total percentage volume of the gas in liquid form in the tank by adding the delta percentage volume to 75% volume of the gas in liquid form in the tank.

9. The method of claim 7, wherein calculating the total volume of the gas in liquid form in the tank comprises:
determining that the first voltage value is a negative value indicating that the total volume of the gas in liquid form in the tank is greater than or equal to 50% of the full tank and less than or equal to 75% of the full tank;
converting the first voltage value to the partial volume of the gas in liquid form by calculating a delta percentage volume of the gas in liquid form in the tank between 50% and 75% volume of the gas in liquid form by dividing an absolute value of the first voltage value by a change in voltage value of the first sensor for every percentage increase in volume of the gas in liquid form; and
calculating a total percentage volume of the gas in liquid form in the tank by adding the delta percentage volume to 50% volume of the gas in liquid form in the tank.

10. The method of claim 7, calculating the total volume of the gas in liquid form in the tank comprises:
determining that the second voltage value is a positive value indicating that the total volume of the gas in liquid form in the tank is greater than or equal to 25% of the full tank and less than or equal to 50% of the full tank;
converting the second voltage value to the partial volume of the gas in liquid form by calculating a delta percentage volume of the gas in liquid form in the tank between 25% and 50% volume of the gas in liquid form by:
calculating an intermediate value by dividing the second voltage value by a change in voltage value of the second sensor for every percentage increase in volume of the gas in liquid form; and
subtracting the intermediate value from 25; and
calculating a total percentage volume of the gas in liquid form in the tank by adding the delta percentage volume to 25% volume of the gas in liquid form in the tank.

11. The method of claim 7, calculating the total volume of the gas in liquid form in the tank comprises:
determining that the second voltage value is a negative value indicating that the total volume of the gas in liquid form in the tank is less than or equal to 25% of the full tank;
converting the second voltage value to the partial volume of the gas in liquid form by calculating a percentage volume of the gas in liquid form in the tank below the 25% volume of the gas in liquid form by dividing an absolute value of the second voltage value by a change in voltage value of the second sensor for every percentage increase in volume of the gas in liquid form; and
determine the calculated percentage volume of the gas in liquid form as a total percentage volume of the gas in liquid form in the tank.

* * * * *